United States Patent [19]

Tamori et al.

[11] 4,293,952
[45] Oct. 6, 1981

[54] SAMPLING FUNCTION TYPE EQUALIZER

[75] Inventors: Michitoshi Tamori, Tokyo; Kazuo Kawai, Yokohama, both of Japan

[73] Assignee: Kokusai Denshin Denwa Co., Ltd., Tokyo, Japan

[21] Appl. No.: 61,398

[22] Filed: Jul. 27, 1979

[30] Foreign Application Priority Data

Jul. 27, 1978 [JP] Japan .................................. 53-90988

[51] Int. Cl.³ .................... H04B 3/04; H03H 21/00; G06F 15/34
[52] U.S. Cl. .................................. 375/14; 333/28 R; 375/11; 364/724; 364/728
[58] Field of Search ........................ 375/11, 12, 14, 15; 364/724, 728, 825; 333/18, 28 R

[56] References Cited

U.S. PATENT DOCUMENTS

| | | | |
|---|---|---|---|
| 4,006,352 | 2/1977 | Sato | 375/13 X |
| 4,027,258 | 5/1977 | Perreault | 375/12 X |
| 4,041,418 | 8/1977 | Koeth | 375/14 X |
| 4,071,827 | 1/1978 | Kolke et al. | 375/12 |
| 4,097,807 | 6/1978 | Fujimura | 375/14 |
| 4,145,747 | 3/1979 | Sakaki et al. | 375/15 X |
| 4,196,405 | 4/1980 | Le Dily | 375/14 X |

OTHER PUBLICATIONS

Cho: Mean–Squared–Error Equalization Using Manually Adjusted Equalizers, Bell System Technical Journal, vol. 53 No. 3 May–Jun. 1974.

Primary Examiner—Felix D. Gruber
Attorney, Agent, or Firm—Armstrong, Nikaido, Marmelstein & Kubovcik

[57] ABSTRACT

In a sampling function type equalizer having a transversal filter with a plurality of potentiometers, the tap weights of the transversal filter are adjusted according to the desired values of the amplitude-frequency characteristics $A_p(n)$, and the delay-frequency characteristics $\tau_p(n)$. The first multiplication of $A_p(n)$ and the predetermined discrete function in addition to the second multiplication of said $\tau_p(n)$ and said predetermined discrete function, are performed. Also, the Bessel function is provided according to the product of the second multiplication. The first convolution integration is performed for the product of the first multiplication, the second convolution integration is performed for the output of the Bessel function, and the third convolution integration is performed between the results of said first and the second convolution integrations. The result of the third convolution integration provides the tap weights of the potentiometers of the transversal filter.

3 Claims, 3 Drawing Figures

SAMPLING FUNCTION TYPE EQUALIZER

BACKGROUND OF THE INVENTION

The present invention relates to an equalizer for equalizing both the amplitude distortion and the delay distortion of a communication transmission channel.

A prior type of manually adjustable equalizer is provided with a plurality of circuits, each having a convex curved characteristic called a "bump". Both the amplitude characteristic and the delay characteristic, and the combination of these circuits, provided the desired characteristics.

However, prior techniques have the disadvantage that a considerable amount of time and labor is required for adjustment, so as to obtain the desired combined characteristics. This is to say, in FIG. 1, supposing that the desired characteristics 24 is combined by the characteristics 21, 22 and 23, the adjustment of the peak value 22 of the component circuit readily causes an interference with another values of the curves 21 and 23 in the frequency range under the control of the adjacent component circuits.

SUMMARY OF THE INVENTION

It is an objective therefore of the present invention, to overcome the disadvantages and limitations of the prior manually adjustable type equalizer by providing a new and improved equalizer.

Another objective of the present invention, is to provide an equalizer which allows individual adjustment of any component circuit without causing interference to any of the other component circuits and therefore requires no readjustment for any of the other component circuits.

The above and other objects are attained by a sampling function type equalizer comprising;

(a) a transversal filter having an input signal terminal (C1), a delay line having a plurality of delay elements each providing the delay time ($\tau$), a plurality of potentiometers each connected to the tap of the delay line, an adder for providing the sum of the outputs of the taps, and, an output signal terminal (C2) connected to the output of said adder to provide the equalized output signal, (b) means for storing elements of the desired amplitude-frequency characteristics $A_p(n)$, (c) means for storing elements of the desired delay-frequency characteristics $\tau_p(n)$, (d) conversion means for the conversion from $A_p(n)$ to $$\left\{10^{\frac{A_p(n)}{20}} - 1\right\},$$

(e) a first multiplication means for providing the product of the output of the conversion means and the output of the predetermined discrete function generator, (f) a second multiplication means for providing the product of $\tau_p(n)$ and the modified output of the predetermined discrete function generator, (g) a Bessel function generator connected to the output of the second multiplication means, (h) a means for providing the convolution integrations including the first convolution integration to the output of the first multiplication means; the second convolution integration to the output of said Bessel function generator; and the third convolution integration between the outputs of the first convolution integration and second convolution integration, (i) a means for providing the result of the convolution integration as expressed in (h) as the tap weight of the potentiometers of the transversal filter previously expressed in (a).

BRIEF DESCRIPTION OF THE DRAWINGS

The foregoing and other objectives, features, and attendant advantages of the present invention will be more highly appreciated as they become better understood by means of the following description and accompanying drawings wherein.

DESCRIPTION OF THE PREFERRED EMBODIMENT

Figure 1:
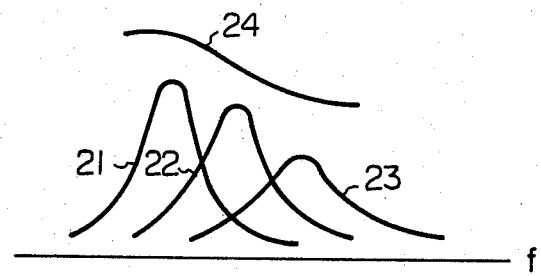
FIG. 1 is an explanatory curves showing the superposition of equalization characteristics in a prior equalizer.
Figure 2:
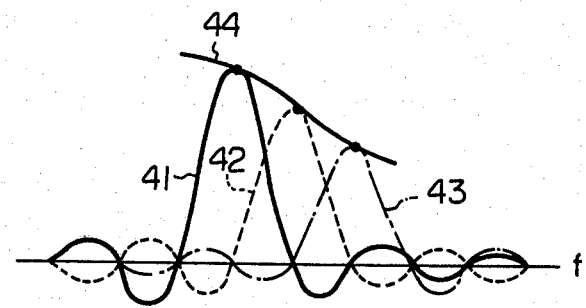
FIG. 2 is an explanatory curve showing the superposition of equalization characteristics according to the present invention.

The principle of this invention is accounted for, referring to FIG. 2, based on the sampling function theory. Namely, it is based on the fact that each characteristic curve of the sampling function type (41), (42) or (43) makes zero crossings with each other at the center frequency of the adjacent circuits. This results in a feature that the peak values of such adjacent circuits can, by themselves, be the sampling values of the combined characteristic (44).

This invention is based on the above mentioned sampling function theory and is directed to the concept which allows an amplitude characteristic and/or a delay characteristic of the sampling function type to be produced on the frequency axis.

Explanation is made below for the fundamental theory from which this invention is derived.

When $\omega_{on}$ and T are given with appropriate constant values and also when samplings are made every $\Delta f = 1/(2T)$ Hz, a sampling function $A_p \sin T(\omega - \omega_{on})/T(\omega - \omega_{on})$, wherein $A_p$ which has a dimension of dB is a peak value of the sampling function, gives an information source vector shown below:

$$\underline{A} = [0 \ldots 0 A_p 0 \ldots 0]^T \quad (1),$$

wherein a suffix T shows a transposition of the vector.

Since such a vector is generally shown in the form of common logarithm, it is converted to a linear form as shown below:

$$\underline{A} = \left[1 \ldots 1 \, 10^{\frac{A_p}{20}} \, 1 \ldots 1\right]^T \quad (2)$$

Conversion of this equation carried out for the purpose to show $\underline{A}$ as a sum of cosine series gives:

$$A_n = \sum_{m=0}^{n-1} a_m \cos(m \, \tau \, \omega_n) \quad (3)$$

In order to solve m, a reciprocal function of equation (3) is rewritten as shown below:

$$\underline{a} = [C]^{-1}\underline{A} \tag{4}$$

In this case, for the prevention of a matrix [C] from becoming a singular matrix, selection is made to allow the $\pi$ range of the first cosine component to correspond to the band. For example, selection is made to make $\tau\omega_N = \tau N\Omega = \pi$ true,
providing $\tau\omega_n = \tau n\Omega$ and $n = N$.

Equation (4) is converted to:

$$\underline{a} = [C]^{-1}\underline{E} + [C]^{-1}B \tag{5},$$

wherein $$\underline{E} = [1 \, 1 \ldots 1]^T, \, B = \left[0 \ldots 0 \left(10^{\frac{A_p}{20}} - 1\right) 0 \ldots 0\right]^T$$

After defining the elements of the n-th column of the matrix with N-dimension $[C]^{-1}$ as $m = 0, 1, 2, \cdots, (N-1)$-th, and also after defining the elements of the m-th column of the matrix with N-dimension $[C]^{-1}$ as $n = 0, 1, 2 \cdots, (N-1)$-th, the general solution is obtained for matrix $[C]^{-1}$ as shown below:

(i) When N is an even number:

$$[C]^{-1}(m,n) = \begin{pmatrix} 0 & \vdots & 2/N \; 0 \; 2/N \ldots \\ \vdots & & \\ 2/N & \vdots & \\ 0 & \vdots & \\ 2/N & \vdots & \frac{2}{N}\left\{(-1)^{m+n-1} + \cos\left(mn\frac{\pi}{N}\right)\right\} \\ 0 & \vdots & \\ \vdots & & \end{pmatrix} \tag{6a}$$

(ii) When N is an odd number:

$$[C]^{-1}(m,n) = \begin{pmatrix} 1/N & \vdots & 0 \; 2/N \; 0 \\ \vdots & & \\ 0 & \vdots & \\ 2/N & \vdots & \\ 0 & \vdots & \frac{2}{N}\left\{(-1)^{m+n} + \cos\left(mn\frac{\pi}{N}\right)\right\} \\ \vdots & & \\ \vdots & & \end{pmatrix} \tag{6b}$$

Therefore, for both cases where N is an odd number and N is an even number, $[C]^{-1}\underline{E}$ can be shown as:

$$[C]^{-1}\underline{E} = [1 \; 0 \ldots 0]^T \tag{7}$$

Accordingly, when a peak value $A_p$(dB) is given to the n-th center frequency, the coefficient of the cosine series $a^{(n)}$ is shown as follows, based on equation (5):

$$\underline{a}^{(n)} = [a_1 a_2 \ldots a_m \ldots a_{N-1}]^T \tag{8}$$

$$a_m = \left(10^{\frac{A_p}{20}} - 1\right)\frac{2}{N}\left\{(-1)^{m+n-1} + \cos\left(mn\frac{\pi}{N}\right)\right\}$$

$$a_o = 1$$

In this equation N is supposed to be an even number. In the case where N is an odd number, a corresponding equation can be readily obtained based on equation (6b).

In this case, a corresponding transmission function is as shown below:

$$F(\omega) = 1 + \sum_{m=1}^{N-1}\left(10^{\frac{A_p}{20}} - 1\right)\frac{2}{N}\left\{(-1)^{m+n-1} + \cos\left(mn\frac{\pi}{N}\right)\right\}\cos(m\tau\omega) \tag{9}$$

The transmission function of a transversal filter for a positive pair tap weight is shown as follows:

$$F(\omega) = 1 + 2\sum_{m=1}^{N-1}\text{Tap}(m)\cos(m\tau\omega) \tag{10}$$

providing that 1 (one) is put to the center tap and that Tap(m) is put to the other taps. Therefore, realization of equation (9) by means of a transversal filter allows the value of each Tap(m) to be obtained by dividing equation (8) by 2.

$$\text{Tap}(0) = 1.0 \tag{11}$$

$$\text{Tap}(\pm m) = \left(10^{\frac{A_p}{20}} - 1\right)\left\{(-1)^{m+n-1} + \cos\left(mn\frac{\pi}{N}\right)\right\}\bigg/N$$

A process to obtain a delay characteristic of the sampling function type is discussed below. An information source regarding delay is assumed as shown below:

$$\underline{T} = [0 \ldots 0 \tau_p 0 \ldots 0]^T \tag{12}$$

wherein $\tau_p$ is a peak value of the sampling function.

When being shown in the form of cosine reciprocal series, this can be shown:

$$\underline{t} = [C]^{-1}\underline{T} \tag{13}$$

When assuming that N is an even number, the elements of $\underline{t}$ is shown in an equation similar to equation (8) as shown below:

$$\underline{t}^{(n)} = [t_1 t_2 \ldots t_m \ldots t_{N-1}]^T \tag{14}$$

$$t_m = \tau_p \frac{2}{N}\left\{(-1)^{m+n-1} + \cos\left(mn\frac{\pi}{N}\right)\right\}$$

Incidentally, since the transmission function is shown as:

$$G(j\omega) = \exp\left\{-j\int \sum_{m=1}^{N-1}\underline{t}^{(n)}\cos(m\tau\omega)\,d\omega\right\}.$$

this can be shown as follows:

$$G(j\omega) = \exp\left\{-j\sum_{m=1}^{N-1} z_m \sin(m\tau\omega)\right\} \quad (15)$$

$$z_m = \frac{1}{m}\left(\frac{\tau_p}{\tau}\right)\frac{2}{N}\left\{(-1)^{m+n-1} + \cos\left(mn\frac{\pi}{N}\right)\right\}$$

One arbitrary element of equation (15) $\exp\{-jz_m \sin(m\tau\omega)\}$ is expanded by utilizing a Bessel function as shown below:

$$e^{\{-jz_m \sin(m\tau\omega)\}} = \sum_{l=-\infty}^{\infty} J_l(z_m) e^{-jml\tau\omega} \quad (16)$$

The right side of this equation is shown as follows, in the form of time series, when $\delta$ function is employed:

$$H_m(t) = \sum_{l=-\infty}^{\infty} J_l(z_m)\,\delta(t - ml\tau) \quad (17)$$

Since the transmission function of equation (15) is a product of transmission functions relating to each cosine component, this is equivalent to a convolution integral insofar as the time axis is concerned, and can be shown as follows:

$$\text{Tap}(\pm l) = \quad (18)$$
$$\sum_{l_{N-1}=-\infty}^{\infty} \cdots \sum_{l_3=-\infty}^{\infty} \sum_{l_2=-\infty}^{\infty} [H_{N-1}\{(N-1)l_{N-1}\tau\} \ldots$$
$$H_2(2l_2\tau)H_1\{(l - l_{N-1} \ldots - l_2 - l_1)\tau\}]$$

As described in the above, the following procedure can be applicable to obtain tap weights of transversal filters for the ultimate purpose of obtaining a required delay characteristic in the form of a sampling function:

(a) Elements of a cosine reciprocal matrix which is multiplied by a constant value to be determined following input data are selected as variables,
(b) A Bessel function series is obtained, and
(c) A convolution integral is conducted, after putting zeroes to the Bessel function series, following the frequency of the cosine components.

Figure 3:
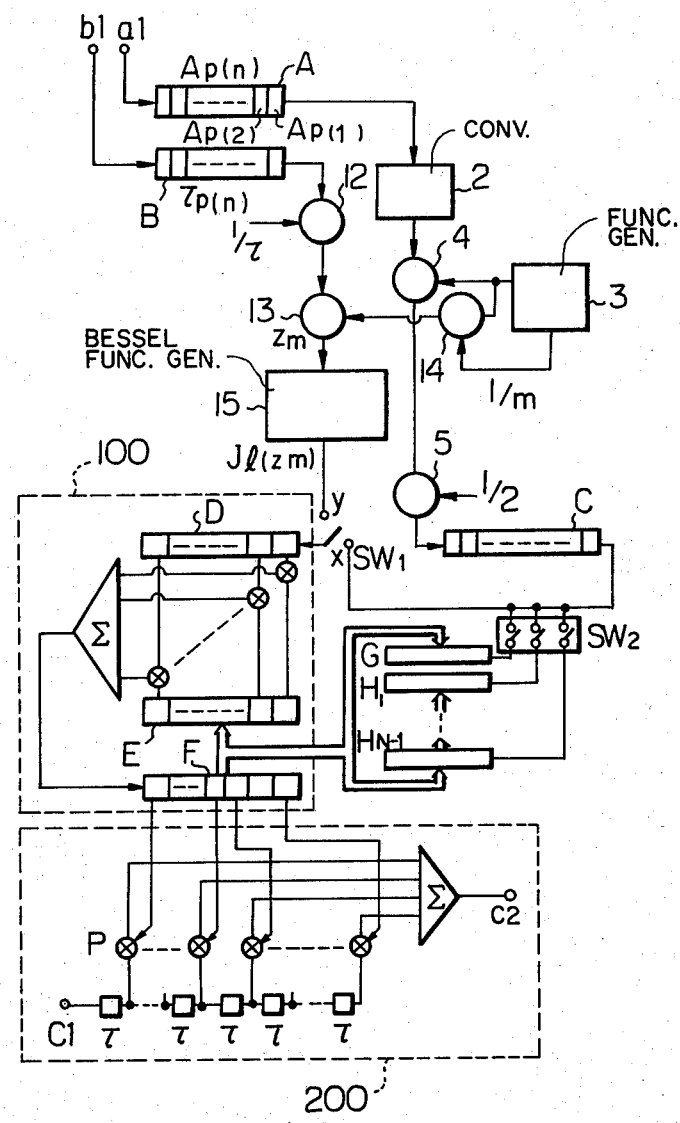
FIG. 3 is a circuit diagram of the equalizer according to the present invention.

FIG. 3 shows an embodiment of this invention.

Referring to FIG. 3, indicated as (200) is a transversal filter, and signals to be equalized are applied to an input terminal ($C_1$), before they are outputted from an output terminal ($C_2$) after being equalized. Indicated as ($\tau$) are delay elements of which the delay times are identical to the sampling periods of input signals, indicated as (P) are potentiometers, and indicated as ($\Sigma$) is an adder following the theory discussed in the above. Potentiometer (P) can be adjusted as described below, for the purpose of adjustment of the tap weights.

Specifications or given conditions are to be given as a required characteristic for an equalizer are peak values of a sampling function $A_p(n)$ and the corresponding orders of such peak values in relation to the center frequency of the sampling function $\tau_p(n)$.

$A_p(n)$ shown in the form of a desirable function are inputted to an input terminal (a1) following the order of n, before they are stored in a memory (A).

Each piece of information $A_p(n)$, being outputted from the memory (A), is applied to a converter (2) to be converted into the value of $$\left\{10^{\frac{A_p(n)}{20}} - 1\right\}$$

for the purpose of implementation of equation (5). The information is then applied to a multiplier (4) to be multiplied by the output of a function producer (3)

$$\frac{2}{N}\left\{(-1)^{m+n-1} + \cos\left(mn\frac{\pi}{N}\right)\right\}$$

which is calculated based on equation (6a), when n is an even number, or based on equation (6b), when n is an odd number, for the purpose of implementation of equations (8) and (11). The information is further applied to a multiplier (5) to be divided by 2, before it is stored in a memory (C). During the calculation, a switch (SW1) allows a contact (x) to close, and as a result the information stored in memory (C) is allowed to move into a memory (D). An initial value of 1 (one) is stored in advance in a memory (E), and the information outputted from memory (D) is multiplied by the information stored in memory (E) is inputted into a memory (F). The information stored in memory (F) is forwarded to memory (E) to keep the information stored in memory (E) up to date. A block (100) which comprises memories (D), (E) and (F) and adder ($\Sigma$), of which the function is to implement equation (18), that was discussed above, is called a convolution integrator.

On the other hand, since n of $A_p(n)$ are integer variables, the same process as described is applied to the other values of (n). In other words, each of the other values of (n) is applied to convertor (2), and multipliers (4) and (5) in sequence and the results are stored in memories (C) and (D). Thereafter, a convolution integral process is conducted for these results and the information is stored in memory (E).

The final results obtained by application of such a process to all the values of (n) are stored in a memory (G).

Next, an embodiment regarding $\tau_p(n)$ is described below.

The input information $\tau_p(n)$ received at a terminal (b1) is inputted to a memory (B), before it is applied to a multiplier (12) to be divided by $\tau$. The output is applied to a multiplier (13) to be multiplied by the value which is a product of the output of function generator (3)

$$\left(\frac{2}{N}\left\{(-1)^{m+n-1} + \cos\left(mn\frac{\pi}{N}\right)\right\}\right)$$

and $1/m$ for the purpose to implement equation (15). The output $z_m$ is inputted to a Bessel function generator (15), which produces a Bessel function series following the inputted values. Switch (SW1) allows a contact (y) to close to cause the output of Bessel function generator (15) to be inputted into memory (D).

An initial value of 100 - - - 0 is stored in memory (E) in advance, and the information stored in memories (D) and (E) is operated upon by the convolution integral process, before the result of the information is stored in memory (F). Memory (D) is inputted with the succeedingly revised values of Bessel function series in succession for implementation of equation (18) allowing the convolution integral process to be repeated.

The final result of the information is stored in memory ($H_{N-1}$).

A similar process is employed to obtain a time series, representing a required delay characteristic in the form of sampling function and such a time series is inputted in memory ($H_{N-1}$). This process, incidentally, causes the information which was previously stored in memory ($H_{N-1}$) to be shifted toward memory ($H_{N-2}$) in sequence until the whole units of memories ($H_1$) through ($H_{N-1}$) are filled with information. At which time a combination of memories ($H_1$) through ($H_{N-1}$) becomes ready to supply a complete set of information representing a required delay characteristic shown in the sampling function.

The information stored in memories (G) and ($H_1$) through ($H_{N-1}$) is applied to convolution integrator (100) through a switch (SW2), and through contact (x) of switch (SW1) to be applied with convolution integral process therein. The results are outputted from a memory (F) of convolution integrator (100) to be employed as tap weights for transversal filter (200).

As explained above in detail, in accordance with this invention, an equalizer is provided comprising of a convertor, a discrete function generator and a convolution integrator in which a equalizer is capable of performing an equalization process. This is implemented by making a sampling function the basic function, to give data which represent an amplitude characteristic and a delay characteristic both of which are discrete on the frequency axis. As a result this removes the fault which is inevitably involved with the equalizers available in the prior technology which is inherently based on superposition of "bump characteristics". In other words, this invention solves the problem that a considerable amount of time and labor is required for adjustment of equalizers in the prior technology.

From the reading of this text it should now be apparent that a new and improved sampling function type equalizer has been found. It should be understood of course, that the embodiment disclosed is merely illustrative and is not intended to limit the scope of the invention. Reference should be made to the appended claims, therefore, rather than the specification as indicating the scope of the invention.

What is claimed is:

1. A sampling function type equalizer having a transversal filter with a plurality of automatically adjusted potentiometers, said equalizer comprising means for converting the amplitude-frequency characteristic and the delay-frequency characteristic to a sampling function type characteristic with the peak value $A_p(n)$ and $\tau_p(n)$, wherein the desired amplitude-frequency characteristic and the delay-frequency characteristic are obtained by superimposing the sampling function type characteristics, first and second multiplying means for multiplying each input $A_p(n)$ and $\tau_p(n)$ by the output of a predetermined discrete function generator, a first convolution integrator means for performing convolution integration on the output of said first multiplying means for obtaining the amplitude equalization characteristic, Bessel function generator means for providing a Bessel function in response to the output of said second multiplying means, a second convolution integrator means for performing convolution integration on the output of said Bessel function generator means, and means for adjusting the tap weight of said potentiometers as a function of the outputs of said first and second convolution integrator means.

2. A sampling function type equalizer comprising
  (a) a transversal filter having an input signal terminal (C1); a delay line having a plurality of delay elements, each providing the delay time ($\tau$), a plurality of potentiometers, each connected to the taps of said delay line, the adder for providing the sum of the outputs of said taps, and an output signal terminal (C2) connected to the output of said adder to provide the equalized output signal,
  (b) means for storing the elements of the desired amplitude-frequency characteristics $A_p(n)$,
  (c) means for storing the elements of the desired delay frequency characteristics $\tau_p(n)$,
  (d) conversion means for the conversion from $A_p(n)$ to $$10^{\frac{A_p(n)}{20}} - 1,$$

(e) first multiplication means for providing the product of the output of the conversion means and the output of a predetermined discrete function generator,
  (f) second multiplication means for providing the product of $\tau_p(n)/\tau$ and $(1/m)$ of the output of the predetermined discrete function generator,
  (g) a Bessel function generator connected to the output of the second multiplication means,
  (h) convolution integration means for performing a first convolution integration on the output of the first multiplication means, for performing a convolution integration on the output of the Bessel function generator, and for performing a third convolution integration between the first convolution integration and the second convolution integration,
  (i) means for providing the result of the third convolution integration as the tap weight of the potentiometers of the transversal filter.

3. A sampling function type equalizer according to claim 2 wherein, the convolution integration means has a switch at the input of the convolution integration means for alternately receiving the output of the first multiplication means, the output of the Bessel function generator, and the result of the two preceeding convolution integrations.

* * * * *